（12）United States Patent
Eckerström et al.

(10) Patent No.: US 10,364,105 B2
(45) Date of Patent: Jul. 30, 2019

(54) PUCK HANDLING DEVICE

(71) Applicant: FlexLink AB, Göteborg (SE)

(72) Inventors: Sven-Erik Eckerström, Hälsö (SE);
Michael Öhman, Mölndal (SE)

(73) Assignee: FlexLink AB, Göteborg (SE)

( * ) Notice: Subject to any disclaimer, the term of this patent is extended or adjusted under 35 U.S.C. 154(b) by 0 days.

(21) Appl. No.: 16/091,703

(22) PCT Filed: Mar. 29, 2017

(86) PCT No.: PCT/SE2017/050305
§ 371 (c)(1),
(2) Date: Oct. 5, 2018

(87) PCT Pub. No.: WO2017/176193
PCT Pub. Date: Oct. 12, 2017

(65) Prior Publication Data
US 2019/0161287 A1 May 30, 2019

(30) Foreign Application Priority Data
Apr. 7, 2016 (SE) ....................... 1650470

(51) Int. Cl.
*B65G 47/71* (2006.01)
*B65G 47/84* (2006.01)
*B65G 47/68* (2006.01)

(52) U.S. Cl.
CPC ......... *B65G 47/846* (2013.01); *B65G 47/681* (2013.01); *B65G 47/71* (2013.01)

(58) Field of Classification Search
CPC ............................. B65G 47/71; B65G 47/681
(Continued)

(56) References Cited

U.S. PATENT DOCUMENTS 2,827,998 A * 3/1958 Breeback ............... B65G 47/71
198/441
3,613,885 A * 10/1971 Rehse ................... B07C 5/3412
209/528
(Continued)

FOREIGN PATENT DOCUMENTS

EP       2447194 A1     5/2012
WO    WO-2011010266 A1  1/2011

OTHER PUBLICATIONS

"International Application Serial No. PCT/SE2017/050305, International Search Report dated May 23, 2017", (May 23, 2017), 5 pgs.
(Continued)

*Primary Examiner* — Douglas A Hess
(74) *Attorney, Agent, or Firm* — Schwegman Lundberg & Woessner, P.A.

(57) ABSTRACT

Puck handling device for a conveyor system, comprising a puck handling disc and a drive means for rotating the puck handling disc, where the puck handling disc comprises a first semi-circular disc comprising a first cut-out and a second semi-circular disc comprising a second cut-out, where the first semi-circular disc and the second semi-circular disc are individually rotatable by the drive means, and where the first cut-out and the second cut-out forms a recess adapted to hold a puck when the puck handling disc is arranged in a first holding state. The advantage of the invention is that a puck handling device adapted to direct a puck from any of two infeed conveyors to any of two outfeed conveyors is provided. This allows for a flexible and quick handling of pucks.

13 Claims, 7 Drawing Sheets

(58) Field of Classification Search
USPC ....... 198/367.1, 368, 370.07, 383, 440, 441,
198/457.01, 457.07, 459.2, 459.6, 459.7
See application file for complete search history.

(56) References Cited

U.S. PATENT DOCUMENTS

| | | | | |
|---|---|---|---|---|
| 3,717,239 | A * | 2/1973 | Carter | B65G 47/71 |
| | | | | 198/374 |
| 3,967,717 | A * | 7/1976 | Bauer | B65G 47/71 |
| | | | | 198/441 |
| 4,196,801 | A | 4/1980 | Hurley et al. | |
| 4,475,645 | A * | 10/1984 | Young | B29C 65/7858 |
| | | | | 198/418.4 |
| 6,520,313 | B1 | 2/2003 | Kaarakainen et al. | |
| 7,036,655 | B2 * | 5/2006 | Schafer | B65G 47/08 |
| | | | | 198/459.2 |
| 8,607,961 | B2 * | 12/2013 | Ek | B23Q 7/16 |
| | | | | 198/340 |
| 8,701,863 | B2 * | 4/2014 | Abbestam | B65G 47/71 |
| | | | | 198/370.01 |
| 9,505,563 | B2 * | 11/2016 | Otts | B65G 47/71 |
| 2005/0207937 | A1 * | 9/2005 | Itoh | |
| 2013/0180835 | A1 | 7/2013 | Ishikawa et al. | |
| 2013/0240324 | A1 * | 9/2013 | Abbestam et al. | |
| 2016/0039615 | A1 | 2/2016 | Otts | |

OTHER PUBLICATIONS

"International Application Serial No. PCT/SE2017/050305, Written Opinion dated May 23, 2017", (May 23, 2017), 5 pgs.

\* cited by examiner

US 10,364,105 B2

PUCK HANDLING DEVICE

PRIORITY APPLICATIONS

This application is a U.S. National Stage Filing under 35 U.S.C. 371 from International Application No. PCT/SE2017/050305, filed on Mar. 29, 2017, and published as WO2017/176193 on Oct. 12, 2017, which claims the benefit of priority to Swedish Application No. 1650470-6, filed on Apr. 7, 2016; the benefit of priority of each of which is hereby claimed herein, and which applications and publication are hereby incorporated herein by reference in their entirety.

TECHNICAL FIELD

The present invention relates to a puck handling device for a conveyor system.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets. A specific type of pallet is a puck, which is a round carrier adapted for smaller and more lightweight objects.

A pallet is conveyed along the conveying device, which comprises different work stations. At a work station, the pallet will be stopped such that the operation may be performed on the transported object. In some cases, the object may pass a specific work station without an operation being performed on the object.

If the conveying device is of a conventional type, in which all work stations are positioned after each other and the operations on the objects are performed synchronous, every pallet will stop at each work station. If no operation is to be performed on an object at a specific work station, the object will have to wait until the operation on the previous object at that work station is ready, until the object can continue. All pallets are in this case released at the same time and moves at the same time. One advantage of such a system is that it is easy to predict the performance of the system. One disadvantage of such a system is that it is not very flexible. If the operation time at a work station is long, all objects will have to wait that time, even if there is no operation performed on all objects. Thus, such systems are mostly used for a single product or when the differences in the products are small.

In other systems, the operations on the objects are performed asynchronous, i.e. the pallet stops at a work station where an operation is to be performed, and is released when the operation is ready. In such systems, a relatively large buffer is required between each work station in order to compensate for the different through-flow times of the products and for the different operation times at a work station.

Another way of compensating for different operation times at a work station is to use two or more work stations that perform the same task. They are often positioned close to each other on separate conveyors, and the object is directed to the work station that is free. In this way, the through-flow time of the system can be balanced in order to avoid bottlenecks in the system. In such a system, the pallets travelling on a single conveyor can be directed to either of the two conveyors by the use of a stop device and a simple switch. Alternatively, a diverter disc may be used to direct the pallets to either of the two conveyors.

Some conveyor systems comprise two infeed conveyors, where a pallet traveling on either infeed conveyor could be directed to any of the two outfeed conveyors. In order to provide such a solution, two stop members and a switch are required. In such a system, a diverted disc cannot be used.

A system using stop members and switches may work acceptable in some cases. Such a solution will require several components and will be relatively slow such that the throughput of the system will be limited. There is thus room for improvements.

DISCLOSURE OF INVENTION

An object of the invention is therefore to provide an inventive puck handling device for a conveyor system. A further object of the invention is to provide a puck handling device that can transfer a puck from one of two conveyors to any of the two conveyors. A further object of the invention is to provide a puck handling device that can bypass pucks of one conveyor and stop pucks of the other conveyor. Another object of the invention is to provide a conveyor system comprising a puck handling device.

The solution to the problem according to the invention is described in the characterizing part of claim 1. Claim 11 contains an advantageous conveyor system. The other claims contain advantageous embodiments and further developments of the puck handling device and the conveyor system.

In a puck handling device for a conveyor system, comprising a puck handling disc and a drive means for rotating the puck handling disc, the object of the invention is achieved in that the puck handling disc comprises a first semi-circular disc and a second semi-circular disc, where the first semi-circular disc is provided with a first cut-out and the second semi-circular disc is provided with a second cut-out, where the first semi-circular disc and the second semi-circular disc are individually rotatable by the drive means, and where the first cut-out and the second cut-out forms a recess adapted to hold a puck when the puck handling disc is arranged in a holding state.

By this first embodiment of the puck handling device according to the invention, a puck handling device that can transfer a puck from one of two conveyors to any of the two conveyors is provided. With such a puck handling device, the puck handling disc can hold the puck as a regular diverter disc in order to be able to transfer a puck from a first conveyor to the same first conveyor or from a second conveyor to the same second conveyor. The puck handling disc can further grip the puck firmly, such that the puck is fixed in the recess of the puck handling disc. In this way, the puck handling device is able to transfer a puck from a first conveyor to a second conveyor or from a second conveyor to a first conveyor. The puck handling device can further bypass the flow of one conveyor and block the flow of the other conveyor.

The puck handling device can further divert a puck from a first straight conveyor to a side station at the side of the first conveyor. The side station may comprise a perpendicular conveyor that can transfer the puck to a further puck handling station where the object of the puck can be e.g. machined or measured. The side station may further comprise a return path for the puck such that the diverted puck can be returned to the first conveyor. The side station may also comprise a handling station where the object of the puck can be e.g. machined or measured. In this case, the puck is held firmly by the puck handling disc in a well-defined position.

The inventive puck handling device comprises a puck handling disc having a first semi-circular disc and a second semi-circular disc, where the first semi-circular disc and the second semi-circular disc are individually rotatable by a drive means. The first semi-circular disc is provided with a first cut-out and the second semi-circular disc is provided with a second cut-out which forms a recess adapted to hold a puck when the puck handling disc is arranged in a holding state. The recess may e.g. be semi-circular.

In the holding state, the recess will be larger than the puck that is to be held, such that the puck can easily enter the recess and exit the recess. This state is used when a puck is to be transferred from a first conveyor to the same first conveyor. The puck handling disc will in this state forward a puck from the pick-up position of the first conveyor to the release position of the first conveyor, as a regular diverter disc, and will at the same block the remaining pucks of the first and the second conveyors.

In the gripping state, the recess will have the same size as the puck that is to be held, such that the puck is firmly held in the recess. This is achieved in that the two cut-outs of the two semi-circular discs are rotated somewhat towards each other when a puck has entered the recess, such that the cut-outs will bear against the side walls of the puck. This gripping state is used when a puck is to be transferred from a first conveyor to a second conveyor or from a second conveyor to a first conveyor. The puck handling disc will in this state grip the puck such that the puck will not exit the recess when the puck is at the first release position of the first conveyor. Instead, the puck will be further transferred to the second release position of the second conveyor, where the puck will be released by rotating the two semi-circular discs somewhat away from each other such that he recess is enlarged, which allows the puck to exit the recess.

In the bypass state, the two semi-circular discs are rotated such that they overlap each other. The discs are at the same time positioned such that the straight sides of the semi-circular discs are parallel with a conveyor. This allows the puck flow of one conveyor to pass the puck handling device, while the puck flow of the other conveyor is stopped.

The depth of the semi-circular recess is preferably larger than the radius of a puck that is to be held by the recess. The depth of the recess is preferably 5-15% larger than the radius of the puck, and can be even larger depending on the size of the puck handling disc. This will allow the outer edges of the recess to extend inwards somewhat, such that the distance between the outer edges is somewhat smaller than the diameter of the puck that is to be held. This will ensure that the puck is held in a firm and secure way by the puck handling disc. The outer edges of the recess will ensure that the puck will not exit the recess by accident, since the puck will not only be held by friction but will also be clasped between the outer edges of the recess.

It is also possible to let the depth of the recess correspond to the radius of the puck that is to be held. In this way, the puck will be held only by friction in the recess. The bearing surface of the recess may also be coated with a high friction material that will help to hold the puck in the recess when the puck handling disc is arranged in the gripping state.

The puck handling disc comprises a first semi-circular disc arranged on a first shaft and a second semi-circular disc arranged on a second shaft. The first shaft and the second shaft are concentric and are aligned with the centre axis of the puck handling disc. The outer circumferential of the puck handling disc will follow a circular path when the puck handling disc is rotated, and the outer circumferential of both the semi-circular discs will thus follow the same circular path when they are rotated. With a smooth outer circumferential surface, the puck handling disc can be rotated with pucks bearing against it. This will thus allow the puck handling disc to be used as a stop member for pucks conveyed by any or both of the conveyors.

The semi-circular discs of the puck handling disc are rotated individually by a drive means comprising a first motor and a second motor, where the first motor is adapted to rotate the first semi-circular disc and the second motor is adapted to rotate the second semi-circular disc. The motors are preferably positioned on each side of the centre axis, in order to obtain a compact puck handling device. In this case, each motor may drive a shaft with e.g. a belt transmission or gear wheels. It is also possible to use direct drive motors connected directly to a shaft.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use.

Figure 1:
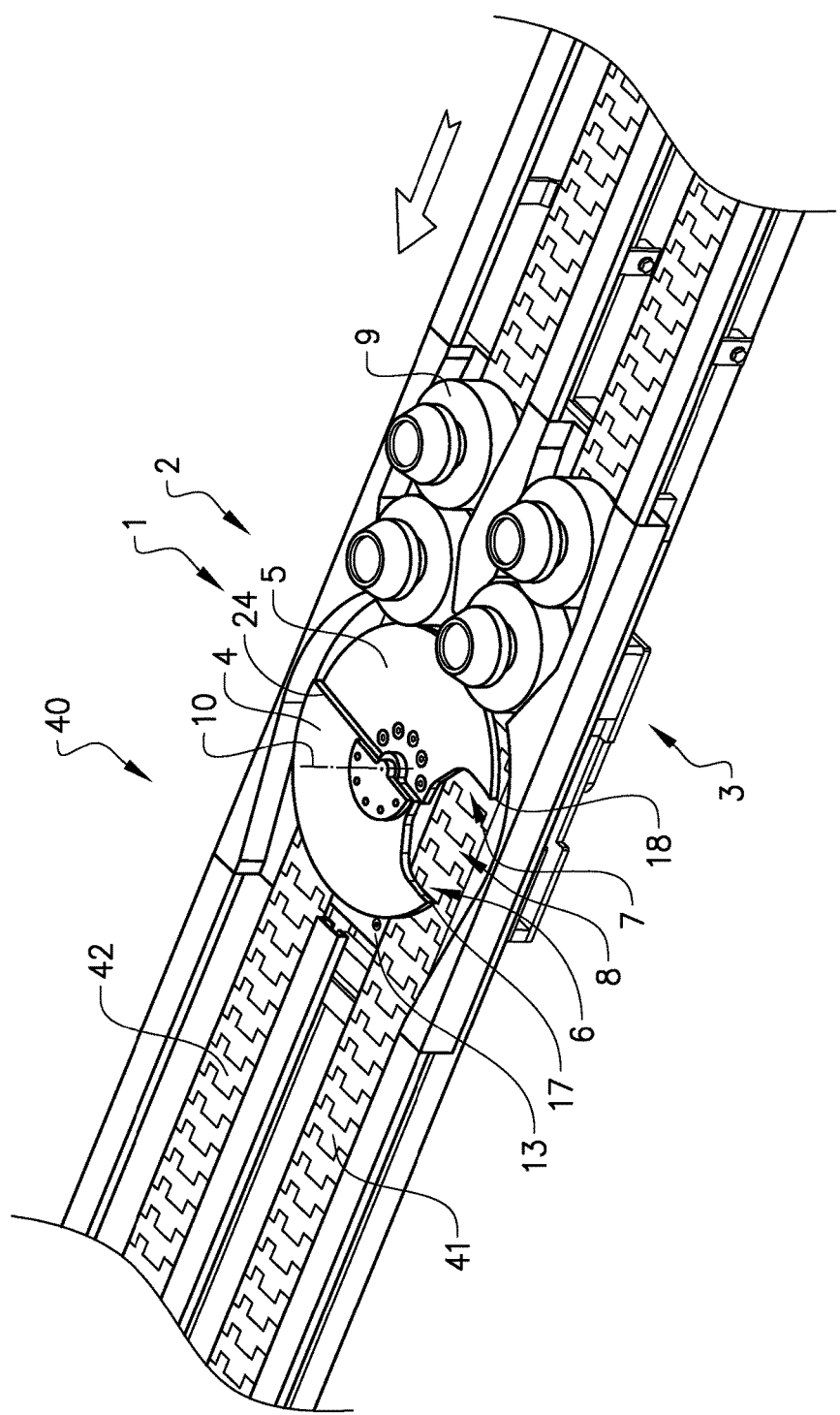
FIG. 1 shows a puck handling device according to the invention arranged in a conveyor system.
Figure 2:
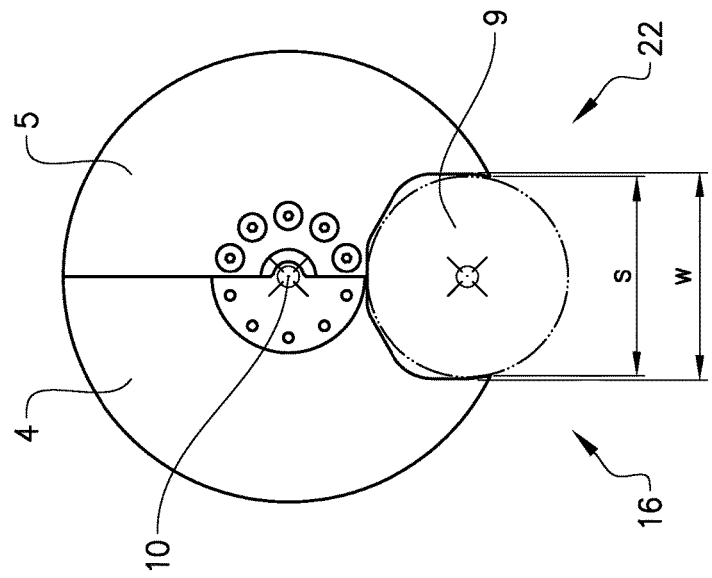
FIG. 2 shows a puck handling disc according to the invention in a holding state.
Figure 3:
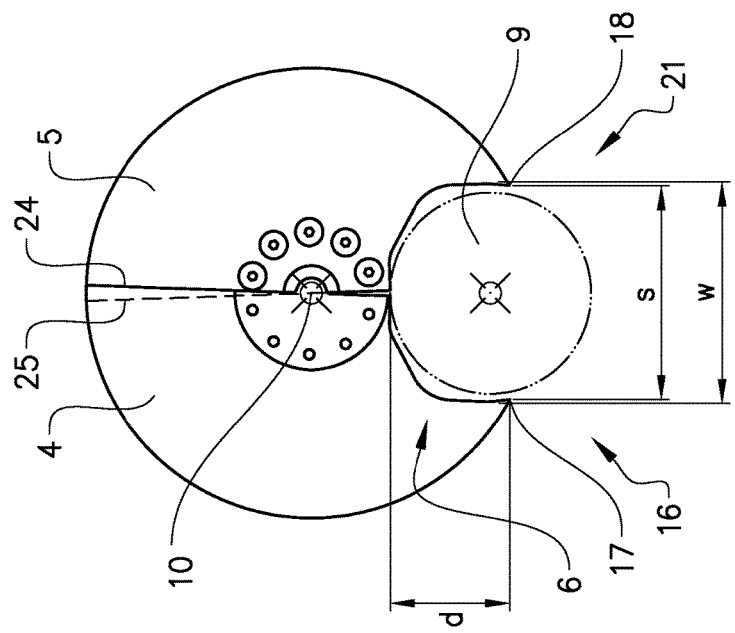
FIG. 3 shows a puck handling disc according to the invention in a gripping state.
Figure 4:
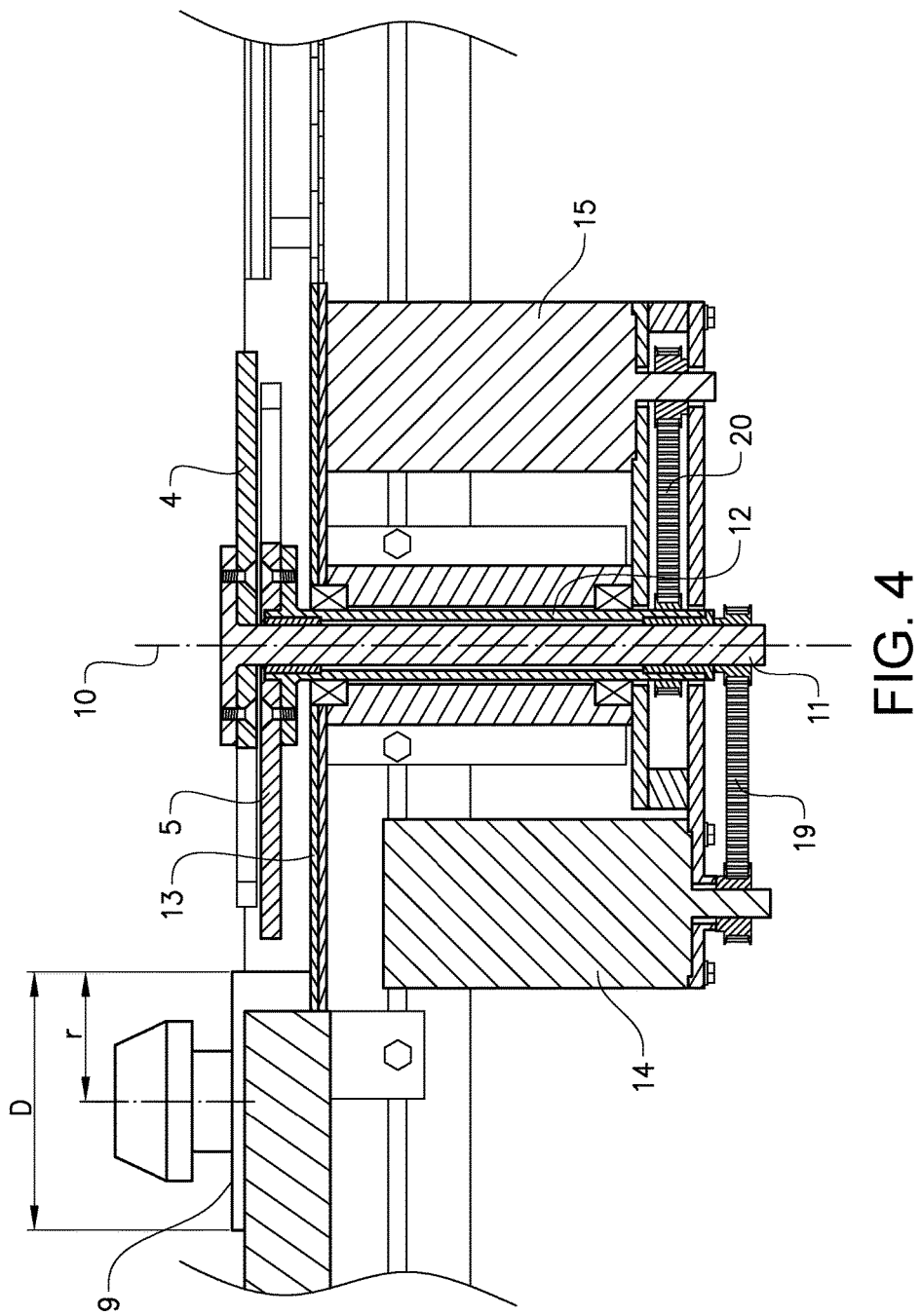
FIG. 4 shows a cut view of a puck handling device according to the invention.

FIG. 1 shows a view of a conveyor system 40 comprising a puck handling device 1 according to the invention, FIGS. 2 and 3 show details of a puck handling disc, and FIG. 4 shows a cross section of a puck handling device.

The puck handling device 1 comprises a puck handling disc 2 and a drive means 3 for rotating the puck handling disc. The puck handling disc is in a first example arranged between a first conveyor 41 and a second conveyor 42, which are both conveying pucks in the same direction, indicated with an arrow. The puck handling disc is positioned at a distance above the conveyor surface, which will allow a wider part of the puck to pass under the puck handling disc. The puck may e.g. be provided with a position flange or the like, where the diameter of the position flange is greater than the body of the puck. The position flange is adapted to hold the puck on the conveyor and is adapted to run under slide rails of the conveyor system. In this way, the puck can be securely conveyed by the conveyor and will not be able to fall out of the conveyor. The puck handling disc will also be able to handle pucks having a non-circular bottom part that is larger than the body of the puck. Such a non-circular bottom part of a puck may e.g. be provided for orientation of the puck such that an object will have a predefined orientation through the conveyor system. A puck may also be provided with a non-circular bottom part where the bearing surface of the puck is enlarged in a longitudinal direction such that the puck can carry larger objects while the puck at the same time can be handled by the puck handling disc. The bottom part may e.g. comprise a fish-tail shape or an hour-glass shape. The body of a puck, i.e. the part of the puck that is to be held by the recess of a puck handling disc, is preferably circular with a diameter D. The puck may further comprise a rotatable slide ring (not shown) arranged in a ring groove positioned above a lower bearing surface of the puck. The slide ring is adapted to be in contact with the contact surfaces of the recess, which will reduce the required power necessary to transfer a puck from the puck train at a pick-up position. The slide ring will also simplify the transfer of a puck from a pick-up position to a release position. The puck may also be provided with identification means, such as an RFID tag or a bar code. In this way, a puck can be identified and transferred to the correct conveyor or working station.

The puck handling disc 2 comprises a first semi-circular disc 4 and a second semi-circular disc 5. The first semi-circular disc 4 is arranged on a first shaft 11 and the second semi-circular disc 5 is arranged on a second shaft 12, where the first shaft 11 and the second shaft 12 are concentric and are aligned with the centre axis 10 of the puck handling disc 2. The first shaft and the second shaft extend upwards through an upper mounting plate 13 of the puck handling device. The upper mounting plate 13 is adapted to be positioned at the same level as the upper surface of a conveyor.

The drive means 3 comprises a first motor 14 and a second motor 15, where the first motor 14 is adapted to rotate the first semi-circular disc 4 and the second motor 15 is adapted to rotate the second semi-circular disc 5. In the shown example, standardized electric motors comprising an encoder are used, which are mounted on each side of the centre axis of the puck handling device. Each shaft is driven by a belt transmission connecting a motor with a shaft, the first shaft 11 is driven by the first motor 14 through a first drive belt 19 and the second shaft 12 is driven by the second motor 15 through a second drive belt 20. Other power transferring means are also possible, such as gear wheels. The motors may also be direct drive motors attached directly to a shaft, such as pancake motors or other motors that can be mounted in a concentric manner. The motors and the upper mounting plate are mounted on brackets to a central body of the puck handling device. The puck handling device is mounted to a conveyor in a removable manner, preferably by the use of a quick release mechanism which allows for a fast and easy replacement of the puck handling device.

The first semi-circular disc 4 is provided with a first cut-out 6 arranged at one end of the semi-circular disc 4, with a first straight side 24 extending from the first cut-out 6 to the opposite end of the first semi-circular disc 4. The second semi-circular disc 5 is provided with a second cut-out 7 arranged at one end of the semi-circular disc 5, with a second straight side 25 extending from the second cut-out 7 to the opposite end of the second semi-circular disc 5. The first cut-out 6 is provided with a first tip 17 arranged at the outer edge of the first cut-out, and the second cut-out 7 is provided with a second tip 18 arranged at the outer edge of the second cut-out. The first cut-out and the second cut-out are in the shown example provided with a straight bottom wall and a straight side wall, but other shapes are also possible. The recess may e.g. be part-circular with a radius corresponding to the puck that is to be handled. The angle of a part-circular cut-out preferably extends over more than 90 degrees, such as 95-100 degrees. The first cut-out 6 and the second cut-out 7 will form a recess 8 in the puck handling disc when the straight sides of the semi-circular discs are arranged substantially in parallel.

FIG. 2 shows an example of the puck handling disc when it is arranged in a holding state. In this state, the greatest width w of the recess is larger than the diameter D of a puck. Further, the width s of the opening 16, i.e. the distance between the first tip 17 and the second tip 18, is also larger than the diameter D of a puck. In this state, the puck handling disc will be able to receive and hold a puck when the puck enters the recess at a first pick-up position at a conveyor. By rotating the puck handling disc to a release position at the same conveyor, the puck can easily leave the recess. With the puck handling disc in this holding state, the puck handling disc will function as a regular diverter disc. The release of a puck can be further simplified in that the recess can be opened when the recess is at the release position. The opening of the recess is done by rotating both the first semi-circular disc and the second semi-circular disc away from each other. The first semi-circular disc and the second semi-circular disc can thus start to move to a new pick-up position before the puck has left the release position. When a regular diverter disc is used, the disc must wait at the release position until the puck has been pulled out of the recess by the conveyor, before the disc can be rotated to a new pick-up position. With the inventive puck handling disc, the rotation to a new pick-up position can start earlier, which saves time. Since the two semi-circular discs can be rotated independently from one another, it is possible to reduce the cycle time of a puck transfer from a pick-up position to a release position. At a pick-up position, one semi-circular disc can be brought into a pick-up position such that the holding of a puck starts, before the other semi-circular disc is in position. At a release position, one semi-circular disc can leave the release position before the puck is delivered while the other semi-circular disc stays in the release position until the puck has left the release position. Since both semi-circular discs can block the puck flow of the conveyors, both semi-circular discs can be rotated independently to any position while the puck flow is blocked. The first semi-circular disc is preferably rotated in a clockwise direction, and the second semi-circular disc is preferably rotated in a counter-clockwise direction to a new pick-up position.

FIG. 3 shows an example of the puck handling disc when it is arranged in a gripping state. In this state, the greatest width w of the recess corresponds to the diameter D of a puck. Further, the width s of the opening 16, i.e. the distance between the first tip 17 and the second tip 18, is smaller than the diameter D of a puck. In this state, the puck handling disc will be able to grip a puck when the puck has entered the recess at a first pick-up position at a conveyor. The puck handling disc will be arranged in the holding state when the puck enters the recess, and will then be changed to the gripping state by rotating the first semi-circular disc and the second semi-circular disc towards each other, such that the width of the recess decreases. In the gripping state, the width of the recess may correspond to the diameter D of the puck such that the puck will bear against the inner side walls of the recess, or the width may be slightly larger such that the puck can move inside the recess. It is however important that the width s of the opening 16 is smaller than the diameter D of a puck such that the puck cannot escape out of the recess. In this state, the puck is gripped in a firm and secure way by the puck handling disc. Since the puck is securely gripped by the puck handling disc, the puck can be transferred to a second release position at another conveyor without leaving the recess at the first release position of the same conveyor. The puck is released by opening the recess, which is done by rotating the first semi-circular disc and the second semi-circular disc away from each other.

The depth d of the semi-circular recess is preferably larger than the radius r of a puck that is to be held by the recess. The depth of the recess is preferably at least 5-15% larger than the radius of the puck, which means that the angle of a cut-out of a semi-circular disc extends over more than 90 degrees. This will allow the tips of the recess to extend inwards somewhat, such that the width s of the opening of the recess is somewhat smaller than the diameter D of the puck that is to be held. This will ensure that the puck is gripped in a firm and secure way by the puck handling disc. The tips of the recess will ensure that the puck will not exit the recess by accident, since the puck will not only be held by friction but will also be clasped between the tips of the recess. In the shown example, the side walls of the recess are straight. It is here preferred to incline the outer part of the side walls inwards by e.g. 5 degrees in order to provide a reliable gripping state for the puck handling disc.

Figure 5:
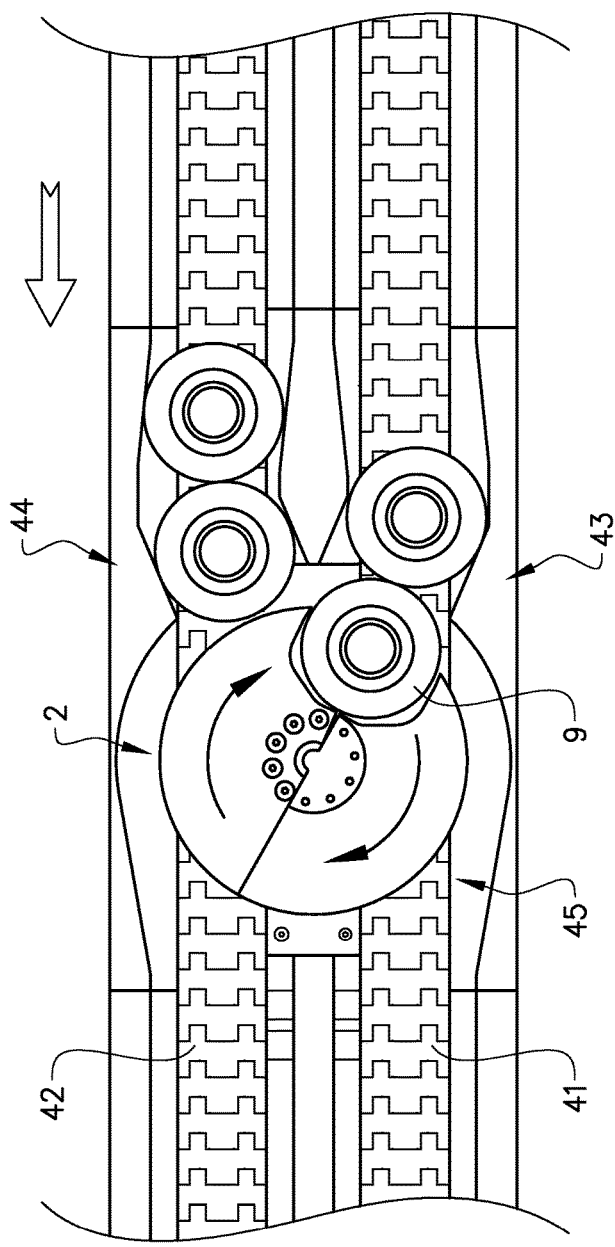
FIG. 5 shows a puck handling device according to the invention in a first pick-up position.

FIG. 5 shows the puck handling disc 2 positioned with the recess in a first pick-up position 43 at the first conveyor 41. The puck handling disc is arranged in the holding state 21 such that a puck can easily enter the recess. As can be seen, the pucks of the second conveyor are stopped at the second pick-up position 44 at the second conveyor 42 by the circumferential of the second semi-circular disc. Since the two semi-circular discs can be rotated independently from one another, the semi-circular discs can be controlled in different ways to reach this position, depending on the previous position. If a puck has been delivered at the second release position, the first semi-circular disc can start to rotate to the first pick-up position in a clockwise direction. Before the first semi-circular disc reaches the first pick-up position, the second semi-circular disc starts to rotate to the first pick-up position in a counter-clockwise direction. In this way, the second semi-circular disc will be able to block the puck flow of the second conveyor before the recess of the first semi-circular disc passes the second pick-up position. The first semi-circular disc can thus reach the first pick-up position and be in position when the second semi-circular disc reaches the first pick-up position.

The exact movement and movement direction of each semi-circular disc is decided depending on the starting position and the end position. This will allow for a reduced cycle time for transfer of a puck from a pick-up position to a release position.

Figure 6:
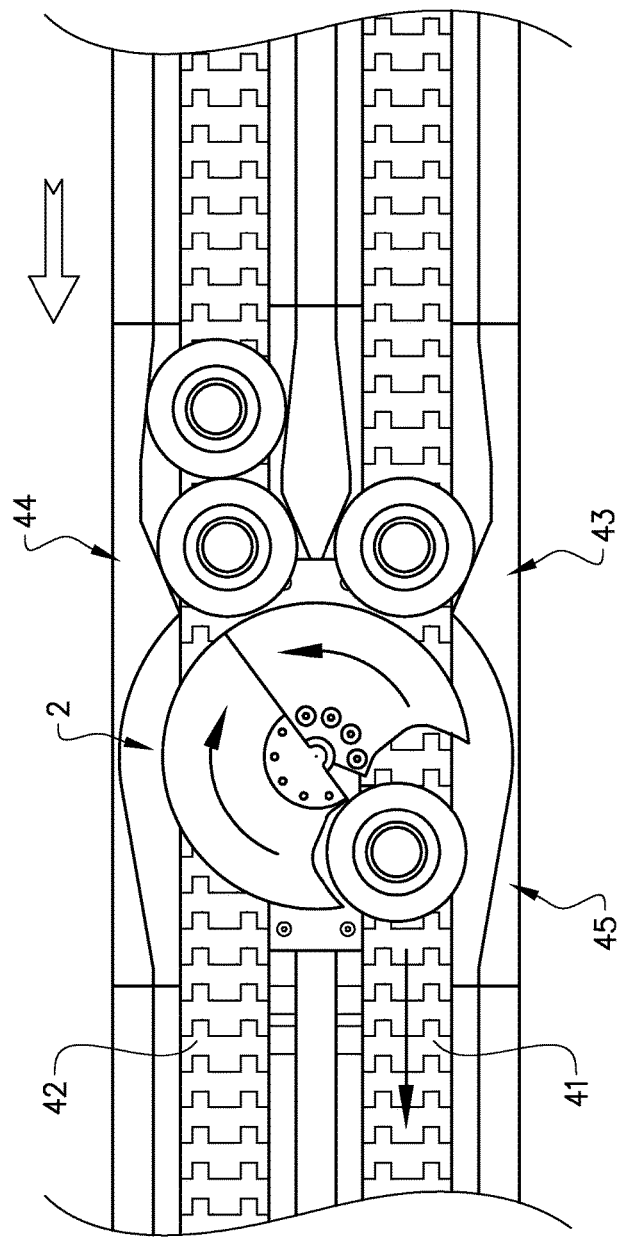
FIG. 6 shows a puck handling device according to the invention in a first release position.

In a first example, the puck that is picked up by the recess at the first pick-up position 43 is to be transferred to the first release position 45 of the first conveyor 41, as shown in FIG. 6. This is achieved in that the puck is forwarded to the first release position 45 by rotating the puck handling disc clockwise from the first pick-up position. When the puck is in the first release position, the puck is released by opening the recess. This is done by rotating both the first semi-circular disc and the second semi-circular disc away from each other. The first and the second semi-circular discs are then rotated to the next desired position by rotating semi-circular discs individually, e.g. as described above, or in another manner, depending on the next position.

Figure 7:
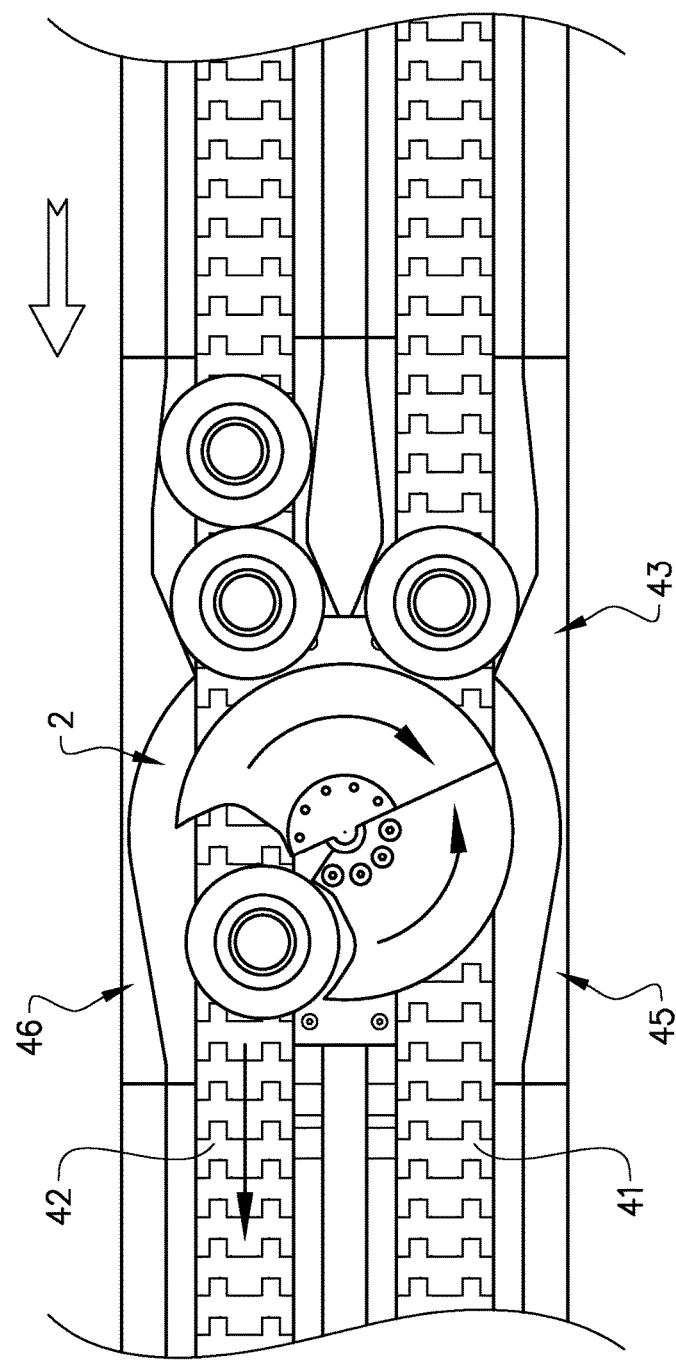
FIG. 7 shows a puck handling device according to the invention in a second release position.

In a second example, shown in FIG. 7, the puck that is picked up by the recess at the first pick-up position 43 is to be transferred to the second release position 46 of the second conveyor 42. In this example, the puck must be gripped by the recess, i.e. the puck handling disc must be arranged in the gripping state. When the puck enters the recess in the first pick-up position, the puck handling disc is arranged in the holding state such that the puck can easily enter the recess. The puck handling disc is then changed to the gripping state such that the puck is securely gripped by the puck handling disc. The change to the gripping state may be made before the puck handling disc starts to rotate, or may be made during the first part of the rotation. The puck handling disc is rotated clockwise to the second release position 46 of the second conveyor. Here, the recess of the puck handling disc is opened by rotating the semi-circular discs away from each other. The puck can now leave the second release position by the moving second conveyor.

Figure 8:
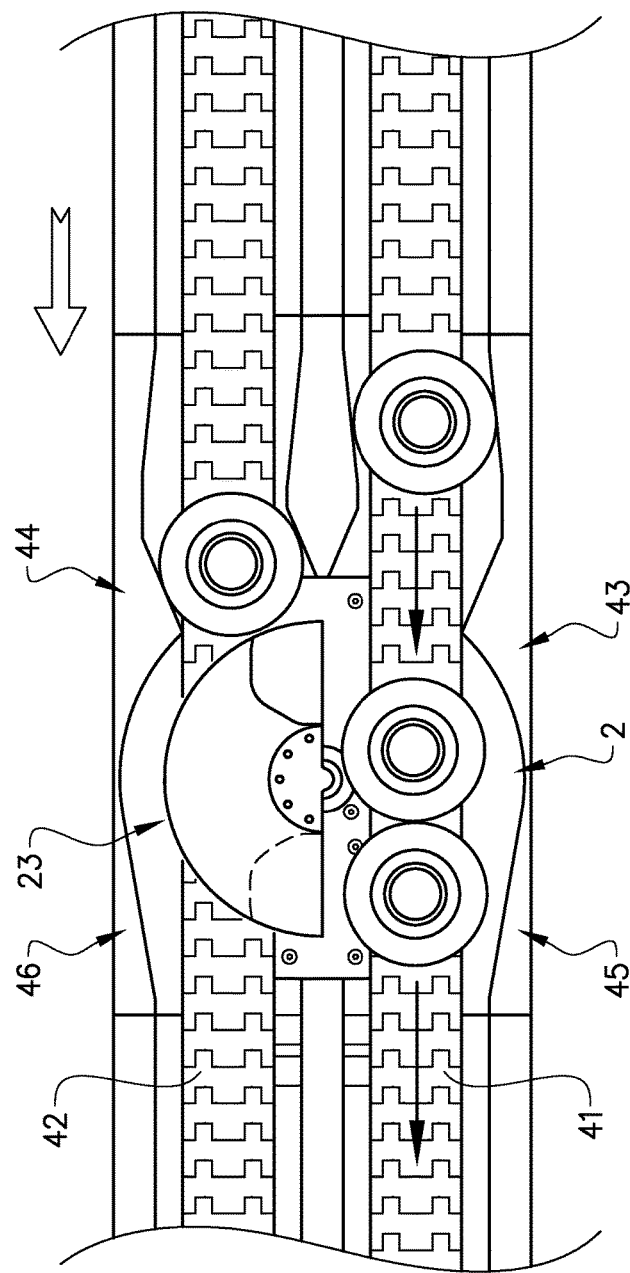
FIG. 8 shows a puck handling device according to the invention in a bypass position.

In a third example, shown in FIG. 8, the pucks of a conveyor are to be bypassed by the puck handling device, in this example the puck flow of the first conveyor 41. The puck handling disc is here arranged in the bypass state 23 by rotating both the semi-circular discs such that they overlap each other. The straight edges of the semi-circular discs are aligned in parallel with the first conveyor and the semi-circular discs cover the second conveyor 42. The puck flow of the first conveyor 41 can now bypass the puck handling disc, and the puck flow of the second conveyor 42 is stopped.

The puck handling device can further be arranged at a first conveyor. In this case, the puck handling disc can divert a puck from the first conveyor to a second release position at a side station arranged at the side of the first conveyor. The puck handling disc can also pick-up a puck at a second pick-up position at the side station and return it to the first conveyor. The side station may e.g. comprise a perpendicular conveyor that can transfer the puck to a further puck handling station where the object of the puck can be e.g. machined or measured. The side station may further comprise a return path for the puck such that the diverted puck can be returned to the first conveyor. The side station may also comprise a handling station where the object of the puck can be e.g. machined or measured. In this case, the puck is held firmly by the puck handling disc in a well-defined position.

The invention is not to be regarded as being limited to the embodiments described above, a number of additional variants and modifications being possible within the scope of the subsequent patent claims. The puck handling disc may have any size and may be made from any suitable material. Other shapes of the recess of the puck handling disc are also possible.

REFERENCE SIGNS

1: Puck handling device
2: Puck handling disc
3: Drive means
4: First semi-circular disc
5: Second semi-circular disc
6: First cut-out
7: Second cut-out
8: Recess 9: Puck
10: Centre axis
11: First shaft
12: Second shaft
13: Upper mounting plate
14: First motor
15: Second motor
16: Opening
17: First tip
18: Second tip
19: First drive belt
20: Second drive belt
21: Holding state
22: Gripping state
23: Bypass state
24: First straight side
25: Second straight side
40: Conveyor system
41: First conveyor
42: Second conveyor
43: First pick-up position
44: Second pick-up position
45: First release position
46: Second release position

The invention claimed is:

1. A puck handling device for a conveyor system, comprising a puck handling disc and a drive means for rotating the puck handling disc, wherein the puck handling disc comprises a first semi-circular disc arranged on a first shaft and a second semi-circular disc arranged on a second shaft, where the first shaft and the second shaft are concentric and are aligned with a center axis of the puck handling disc, where the first semi-circular disc is provided with a first cut-out and the second semi-circular disc is provided with a second cut-out, where the first semi-circular disc and the second semi-circular disc are individually rotatable by the drive means, and where the first cut-out and the second cut-out forms a recess adapted to hold a puck when the puck handling disc is arranged in a holding state.

2. The puck handling device according to claim 1, wherein the recess comprises straight side walls.

3. The puck handling device according to claim 1, wherein the recess is semi-circular.

4. The puck handling device according to claim 1, wherein the depth (d) of the recess is greater than a radius (r) of a puck that is to be held.

5. The puck handling device according to claim 1, wherein a width (s) of the opening of the recess is greater than a diameter (D) of the puck that is to be held when the puck handling disc is arranged in the holding state.

6. The puck handling device according to claim 1, wherein a width (w) of the recess corresponds to a diameter (D) of the puck that is to be held when the puck handling disc is arranged in a gripping state.

7. The puck handling device according to claim 6, wherein the width (s) of the opening of the recess is smaller than the diameter (D) of the puck.

8. The puck handling device according to claim 1, wherein the first semi-circular disc and the second semi-circular disc overlap each other completely when the puck handling disc is arranged in a bypass state.

9. The puck handling device according to claim 1, wherein the drive means comprises a first motor and a second motor, where the first motor is adapted to rotate the first semi-circular disc and the second motor is adapted to rotate the second semi-circular disc.

10. The puck handling device according to claim 9, wherein the first motor comprises a first drive belt adapted to rotate the first shaft and that the second motor comprises a second drive belt adapted to rotate the second shaft.

11. A conveyor system comprising a first conveyor having a first pick-up position and a first release position, a second conveyor having a second pick-up position and a second release position, and a puck handling device according to claim 1, wherein the puck handling device is adapted to transfer a puck from the first conveyor to the second conveyor by gripping the puck with the puck handling disc arranged in a gripping state at the first pick-up position and to transfer the puck to the second release position.

12. The conveyor system according to claim 11, wherein the puck handling device is adapted to bypass a puck from the first pick-up position of the first conveyor to the first release position of the first conveyor by arranging the puck handling disc in a bypass state in which the two semi-circular discs are rotated such that they overlap each other, and where straight sides of the semi-circular discs are parallel with the first conveyor.

13. The conveyor system according to claim 11, wherein the puck handling device at the same time is arranged to stop a puck at the second pick-up position.

* * * * *